United States Patent [19]
Rubel

[11] Patent Number: 5,284,386
[45] Date of Patent: Feb. 8, 1994

[54] MULTI FACET TRACTION DEVICE

[76] Inventor: Edward R. Rubel, 66 School St., Victor, N.Y. 14564

[21] Appl. No.: 729,924

[22] Filed: Jul. 15, 1991

[51] Int. Cl.$^5$ .............................................. B62D 55/26
[52] U.S. Cl. ..................... 305/54; 36/59 R; 301/43; 152/210; 305/35 EB
[58] Field of Search ............... 305/35 R, 35 EB, 38, 305/39, 53, 54, 16, 24; 152/208, 210; 301/43, 45, 46, 41.1, 44.1; 36/114, 124, 126, 127, 128, 129, 134, 59 R

[56] References Cited

U.S. PATENT DOCUMENTS

| 575,662 | 1/1887 | Andresen | 36/59 R |
|---|---|---|---|
| 885,205 | 4/1908 | Ulrich | 305/54 |
| 1,856,320 | 5/1932 | Curtis | 301/41 R |
| 2,061,962 | 11/1936 | Gabriele | 36/59 R |
| 2,714,768 | 8/1955 | Badler | 36/59 R X |
| 3,014,547 | 12/1961 | Van Der Lely | 301/43 X |
| 3,180,442 | 4/1965 | Pomeroy | 301/43 X |
| 3,838,894 | 10/1974 | Reedy | 305/54 X |
| 4,332,424 | 6/1982 | Thompson | 305/54 X |
| 4,530,620 | 7/1985 | McCartney | 301/43 X |
| 4,758,055 | 7/1988 | Anderson | 305/54 X |
| 4,858,697 | 8/1989 | Sherblom | 152/210 X |

FOREIGN PATENT DOCUMENTS

| 551811 | 6/1932 | Fed. Rep. of Germany | 301/43 |
|---|---|---|---|
| 2423147 | 11/1975 | Fed. Rep. of Germany | 305/54 |

Primary Examiner—Russell D. Stormer
Attorney, Agent, or Firm—Cumpston & Shaw

[57] ABSTRACT

A traction device including a bit having a penetrating surface for penetrating a riding surface. The penetrating surface defines the cross sectional area of the bit and includes a plurality of facets wherein each facet intersects a common vertex. In a second embodiment, the penetrating surface defines an oval cross section transverse to the direction of penetration into a riding surface, wherein the circumference of the cross section increases as the distance from the tip increases.

16 Claims, 3 Drawing Sheets

MULTI FACET TRACTION DEVICE

The present invention relates to traction devices, and more particularly to a stud having a penetrating surface including a plurality of facets wherein each facet intersects a common vertex, or a substantially oval cross section transverse to the direction of penetration into the riding surface.

BACKGROUND OF THE INVENTION

Traction devices are employed on vehicles driven over adverse riding surfaces, such as snow, ice, or mud. Traction devices include a penetrating surface which penetrates the riding surface to improve traction of the vehicle.

Prior traction devices include the conical bit and the wedge bit shown in FIGS. 2 and 3. Referring to FIGS. 2A and 2B, the conical bit is a solid cone having a circular cross section transverse to the direction of penetration, wherein the tip of the cone is used to penetrate the riding surface. While the conical bit is an aggressive device, providing deep penetration into the riding surface, the deep penetration results in accelerated wear and low durability of the bit.

Referring to FIGS. 3A and 3B, the wedge bit is formed of a slab of material wherein one corner of the slab is oriented to penetrate the riding surface. The penetrating surface of the wedge includes four facets, wherein two facets are parallel and two facets converge, thereby defining five edges. As the wedge does not penetrate as deeply as the conical bit, the wedge provides a more durable bit which does not provide the same degree of traction as the conical bit.

In an effort to obtain the benefits of the aggressive conical bit and the durable wedge bit, both bits are often arranged in predetermined patterns on the snowmobile track.

To improve durability, the bits of the prior art are often formed of carbide. However, as carbide is expensive to manufacture, machine, and attach to a less expensive steel mount, it is advantageous to minimize the amount of carbide.

SUMMARY OF THE INVENTION

A traction device having improved durability over the conical bits of the prior art and increased penetration and aggressiveness over the wedge bits of the prior art is disclosed. The traction device of the present invention includes a stud, means for mounting the stud, and a bit having a penetrating surface. Preferably, the bit is formed of carbide. The bit may be formed independent of the stud, or may be formed integral with the stud. In the first embodiment of the invention, the penetrating surface includes a plurality of facets wherein each facet intersects a common vertex.

In the second embodiment of the invention, the penetrating surface defines an oval cross section transverse to the direction of penetration of the oval increases as the distance from the tip of the penetrating increases.

DETAILED DESCRIPTION OF PREFERRED EMBODIMENTS

Figure 1:
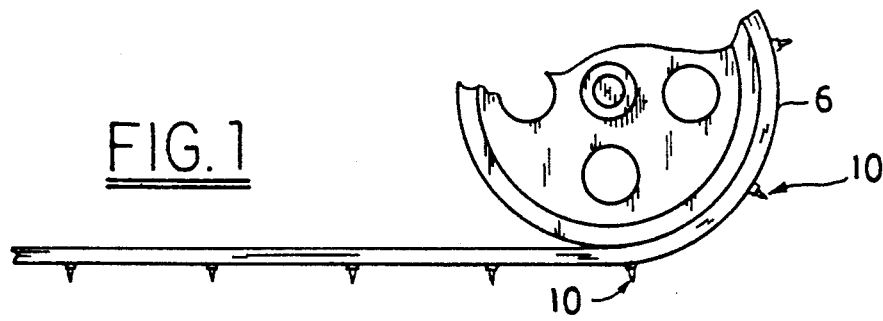
FIG. 1 is a partial cross-sectional view showing the present invention employed in a snowmobile track.
Figure 7:
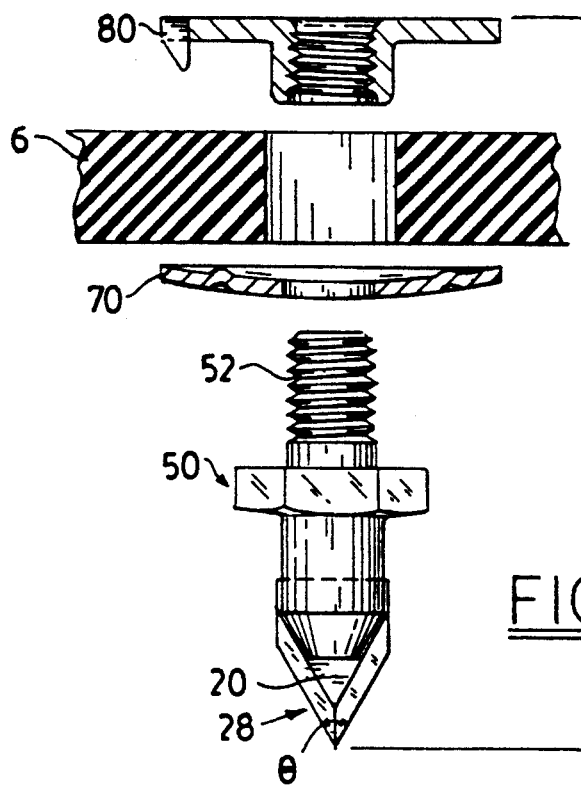
FIG. 7 is an exploded partial cross-sectional view of the the first embodiment of the present invention and a track section.
Figure 8:
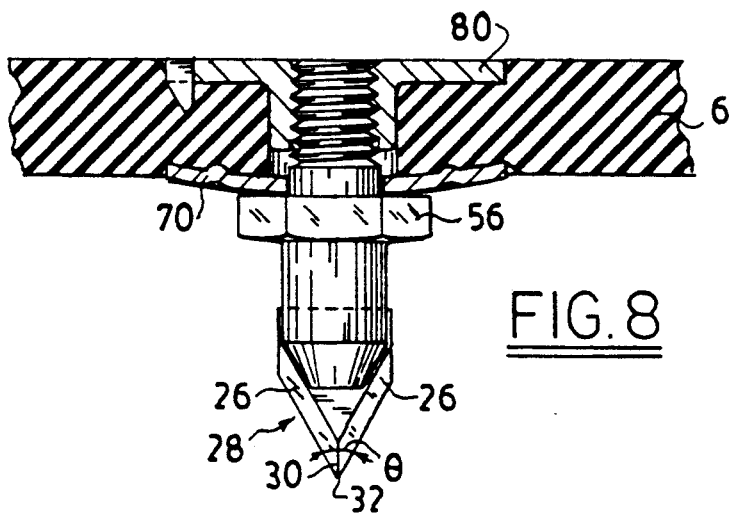
FIG. 8 is a partial cross-sectional view of the first embodiment of the present invention operatively engaged to a track section.

Referring to FIG. 1, the traction device 10 is employed on a snowmobile track 6. As shown in FIGS. 1, 7, and 8, the traction device 10 includes bit 20 of the first embodiment, a substantially cylindrical stud 50, a washer 70, and a T-nut 80.

Referring to FIGS. 5-8, the stud 50 includes a threaded portion 52 having a length sufficient to engage the T-nut 80. The opposing end of the stud 50 includes a support slot 54. Intermediate of the support slot 54 and threaded portion 52, the stud 50 includes peripheral wrench flats 56 for releasable engagement by a wrench (not shown).

Referring to FIGS. 4-6, and 9-11, the bit 20 includes a contact portion 24 sized to be received in the support slot 54, and a penetrating surface 28. The penetrating surface 28 defines the leading volume of the traction device which enters the riding surface. In the first embodiment of the bit 20, the penetrating surface 28 is defined by a plurality of planar facets 26. The facets 26 may be of a variety of configurations such as trapezoidal, parallelograms, rectangular, or triangular.

Figure 4A:
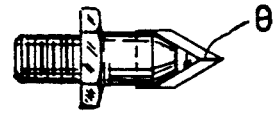
FIGS. 4A and 4B illustrate the multi facet bit embodiment of the present invention.
Figure 4B:
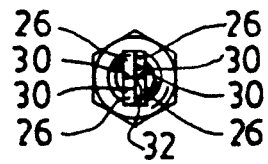
Figure 5:
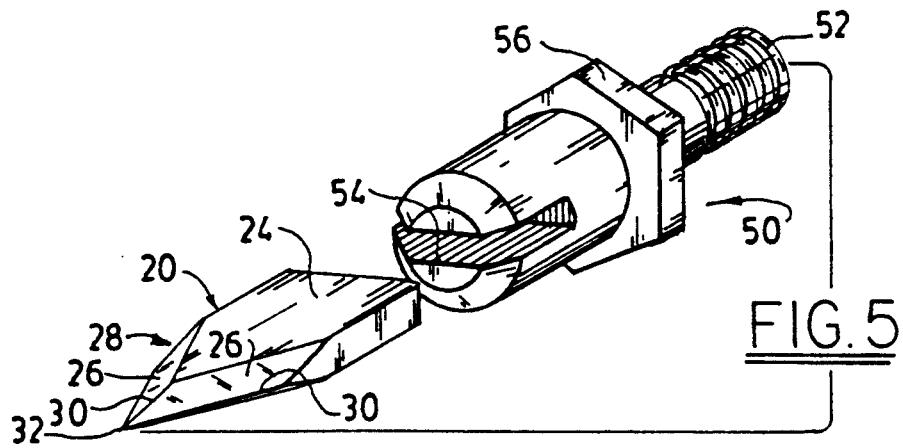
FIG. 5 is an exploded perspective view of the first embodiment of the present invention.

As shown in FIG. 4B, the periphery of the cross section is defined by the facets 26. The facets 26 define the cross sectional area of the penetrating surface 28. The facets 26 form edges 30 at the common sides, or intersections of adjacent facets 26. The facets 26 intersect at a common vertex 32, that is, the point at which the plane of each facet intersects.

Preferably, adjacent facets 26 define a substantially non-dimensional edge 30. However, due to manufacturing techniques and machine tolerances, a surface or radii often exists so that the edge 30 and vertex 32 have a dimension. The surface or radii may be approximately 3/64". The interior dihedral angle defined by adjacent facets 26 is less than 180°.

As shown in FIGS. 5-8, the bit 20 includes parallel surfaces 27 in the region of the contact portion 24. Although the parallel surfaces 27 extend towards the common vertex, the parallel surfaces do not define a portion of the penetrating surface 28. That is, the parallel facets do not define the cross section of the penetrating surface 28. As the parallel surfaces 27 do not define the cross sectional area of the penetrating surface 28, the parallel surfaces are not included in the penetrating surface.

Figure 2A:
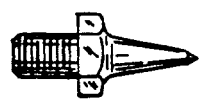
FIGS. 2A and 2B illustrate the conical bit of the prior art.
Figure 2B:

Referring to FIG. 2B, the cross sectional area of the conical bit is defined by a conical penetrating surface.

Figure 3A:
FIGS. 3A and 3B illustrate the wedge bit of the prior art.
Figure 3B:

As shown in FIG. 3B, the cross sectional area of the wedge bit is defined by two facets 13 which intersect along a common edge 15.

In contrast, referring to FIG. 4B, the cross sectional area of the first embodiment of the bit 20 is defined by four facets 26 which intersect at common vertex 32 and define four edges 30. The number of facets 26 in the penetrating surface 28 of the first embodiment equals the number edges 30 formed by the facets.

The penetrating surface 28 in the first embodiment may define a polyhedron wherein all but one of the facets intersect a common point. That is, in a septahedron having 7 facets, 6 facets converge, such that the 6 converging facets define the penetrating surface 28.

As shown in FIGS. 4, 7, and 8, the periphery of the penetrating surface 28 in the first embodiment defines an included angle $\theta$. Preferably, the included angle $\theta$ is approximately 60°. However, the included $\theta$ angle may extend from approximately 120° to 30°. As the included angle $\theta$ is increased, the penetration of the riding surface is reduced, while the durability of the bit 20 is increased. As the riding surface becomes harder, the more important the penetration characteristic becomes.

Alternatively, as the included angle $\theta$ is decreased, the penetration of the bit into the riding surface is increased. The reduced included angle $\theta$ also reduces durability of the bit.

Preferably, the included angle $\theta$ is 60°, which provides a balance between the durability and penetration of the bit 20. However, bits 20 having an included angle $\theta$ of 45° to 75° have proved satisfactory.

Figure 6:
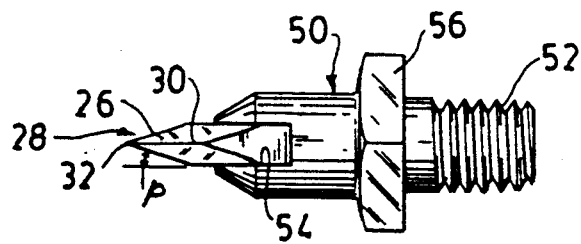
FIG. 6 is a side-elevational view of the present invention.

Referring to FIG. 6, the facets 26 in the first embodiment define a facet angle $\phi$ between the longitudinal axis of the stud 50 and the facets. Preferably, the facet angle $\phi$, is approximately 30°. However, the facet angles $\phi$ may be within a range of 10° to 80°. As the facet angle $\phi$ increases, penetration decreases and durability increases. Conversely, as the facet angle is decreased, penetration increases and durability increases.

Figure 9:
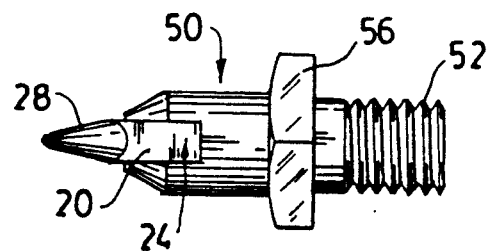
FIG. 9 is a side elevational view of the second embodiment of the present invention.
Figure 10:
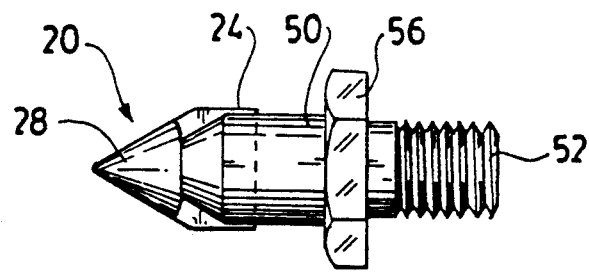
FIG. 10 is a front elevational view of the second embodiment of the present invention.
Figure 11:
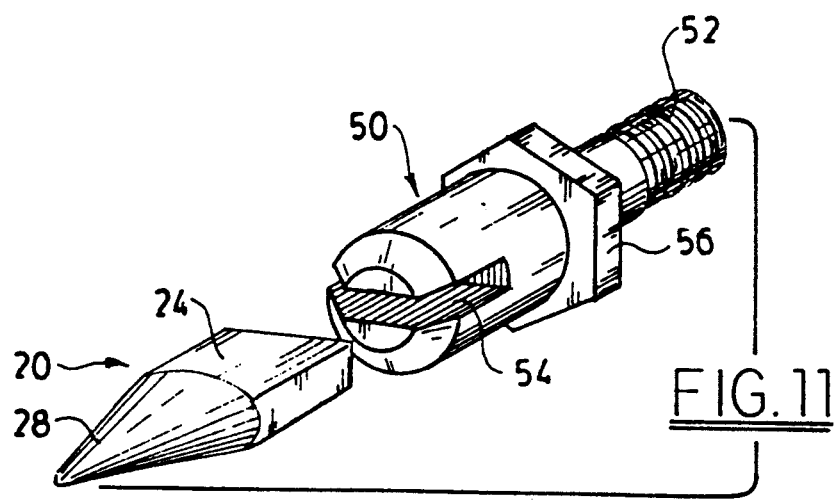
FIG. 11 is an exploded perspective of the bit of the second embodiment of the traction device stud.

As shown in FIGS. 9-11, the second embodiment of the bit 20 includes a penetrating surface 28 defining an elliptical, or oval cross sectional area transverse to the direction of penetration. The oval cross section defines a non-circular periphery having an increasing circumference as the distance from the tip of the bit 20 increases. There are no facets in the oval bit. The oval bit provides a continuous non-circular periphery which may define an ellipse intersecting parabolae, hyperbolae, cycloids, or catenaries, or other curvilinear peripherals having varying radius cross sections.

For example, the bit 20 may have a longitudinal axis of symmetry substantially bisecting identical halves wherein each half defines an arcuate segment such that the cross-sectional area defines a non-circular periphery. The arcuate segments may define circular segments wherein the periphery of the penetrating surface is non-circular. The arcuate segments may also define a parabola, hyperbola, cycloid or catenary.

Alternatively, the penetrating surface may be defined by a combination of facets and a non-circular oval cross-sectional area. The combination may extend either longitudinally or circumferentially about the bit. Specifically, the region of the penetrating surface proximal to the tip may be defined by converging facets, and the region distal to the top may be defined by a non-circular cross-sectional area perpendicular to the direction of penetration into the riding surface.

In a preferred embodiment of the traction device 10, the stud 50 is formed of C1141 steel and the bit 20 is C-11 carbide having a hardness of Rockwell A-88.0; cobalt content of 12%; and transverse rupture strength of approximately 380,000 Psi minimum. The bit 20 has a width of approximately 0.3125" and a thickness of approximately 0.113". However, the exact dimensions of the bit 20 may be varied, as determined by design considerations. A thinner bit 20 presents manufacturing complications and a thicker bit 20 increases material costs and durability.

The bit 20 is brazed to the stud 50 as the contact portion 24 is received in the support slot 54. Alternatively, if the bit 20 is not formed of carbide, or is formed of the same material as the stud 50, the penetrating surface 28 may be integral with the stud.

Referring to FIG. 7, an aperture 7 is formed in the track 6. The threaded portion 52 is passed through the washer 70 and the aperture 7 to engage the T-nut 80. Alternatively, a cleat (not shown) may be used in place of the washer 70. The cleat 70 extends across the width of the track 6 and cooperates with a plurality of traction devices 10.

The stud 50 is threaded into the T-nut 80 to draw the T-nut onto the track. Preferably, the stud 50 is drawn into the T-nut 80 a sufficient distance so that the back of the T-nut and the periphery of the washer 70 are substantially coplanar with the adjacent areas of the track 6. When the traction device 10 is operably engaged with the track 6, the end of the threaded portion 52 of the stud 50 may be substantially flush with the inside track 6, or may extend beyond the plane of the track (not shown).

While a preferred embodiment of the invention has been shown and described with particularity, it will be appreciated that various changes and modifications may suggest themselves to one having ordinary skill in the art upon being apprised of the present invention. It is intended to encompass all such changes and modifications as fall within the scope and spirit of the appended claims.

What is claimed is:

1. A traction device comprising:
   (a) a stud having a cylindrical threaded portion and a support slot; and
   (b) a bit having a penetrating surface and a contact portion, wherein the contact portion is sized to be received in the support slot and the penetrating surface includes a plurality of facets, wherein each facet intersects a common vertex such that adjacent facets intersect along an intersection line to form a dihedral angle, and at least one dihedral angle is acute.

2. The traction device of claim 1, wherein the facets define quadrilaterals.

3. The traction device of claim 1, further comprising threaded means for cooperatively engaging the threaded portion to dispose the traction device in a predetermined orientation.

4. A traction device assembly for retaining a penetrating surface relative to a flexible track, comprising:
   (a) a stud having a threaded portion and a penetrating surface having a tip for initiating penetration of a riding surface, the penetrating surface defined by a substantially curvilinear non-circular cross section transverse to the direction of penetration into the riding surface wherein the circumference of the cross section is defined by intersecting arcuate segments to form a discontinuity in an arcuate segment and the circumference increases as the distance from the tip increases; and (b) a threaded T-nut for cooperatively engaging the threaded portion to retain the flexible track intermediate of the penetrating surface and the T-nut, the T-nut having a substantially larger cross sectional area than the stud.

5. A traction device assembly for retaining a penetrating surface relative to a flexible track, comprising:

(a) a stud having an engagement portion and a penetrating surface, the penetrating surface having a tip for initiating penetration, the penetrating surface having a substantially curvilinear non-circular cross sectional area defined by intersecting arcuate segments, wherein each segment is defined by an independent radius of curvature; and (b) inner plate means for cooperatively engaging the engagement portion of the stud to retain a portion of the track between the inner plate means and the penetrating surface the inner plate means having a substantially larger cross sectional area than the stud.

6. The traction device of claim 5, wherein the arcuate segments at least partially define one of parabolae, hyperbolae, cycloids and catenaries.

7. A traction device assembly for retaining a penetrating surface relative to a flexible track, comprising:

(a) a stud member having a penetrating surface and an elongate portion, the penetrating surface including a plurality of facets, wherein the facets define the periphery of the penetrating surface, and each facet intersects a common vertex such that adjacent facets intersect along an intersection line to form a dihedral angle, and at least one dihedral angle is acute; and (b) inner and outer plates connected to the elongate portion to retain a portion of the flexible track between the inner and the outer plates.

8. The traction of device of claim 7, wherein the facets define quadrilaterals.

9. The traction of device of claim 7, wherein two dihedral angles are acute.

10. The traction of device of claim 7, wherein the penetrating surface comprises carbide.

11. A traction device having a penetrating surface comprising a plurality of facets, wherein the facets define the periphery of the penetrating surface, and each facet is quadrilateral and intersects a common vertex such that adjacent facets intersect along an intersection line to form a dihedral angle, and at least one dihedral angle is acute.

12. A traction device assembly for retaining a penetrating surface relative to a flexible track, comprising:

(a) a stud having a penetrating surface and an elongate portion, the penetrating surface including a plurality of facets, wherein the number of facets equals the number of edges formed by the facets; and (b) inner and outer plates connected to the elongate portion to retain a portion of the flexible track between the inner and the outer plates.

13. The traction device of claim 12, wherein the facets define quadrilaterals.

14. The traction device of claim 12, wherein two dihedral angles are acute.

15. The traction device of claim 12, wherein the penetrating surface comprises carbide.

16. A traction device having a penetrating surface comprising a plurality of quadrilateral facets, wherein the number of quadrilateral facets equals the number of edges formed by the quadrilateral facets.

* * * * *